No. 869,966. PATENTED NOV. 5, 1907.
W. O. FELT.
PROCESS FOR COMPRESSING AND PURIFYING AIR.
APPLICATION FILED APR. 9, 1906.
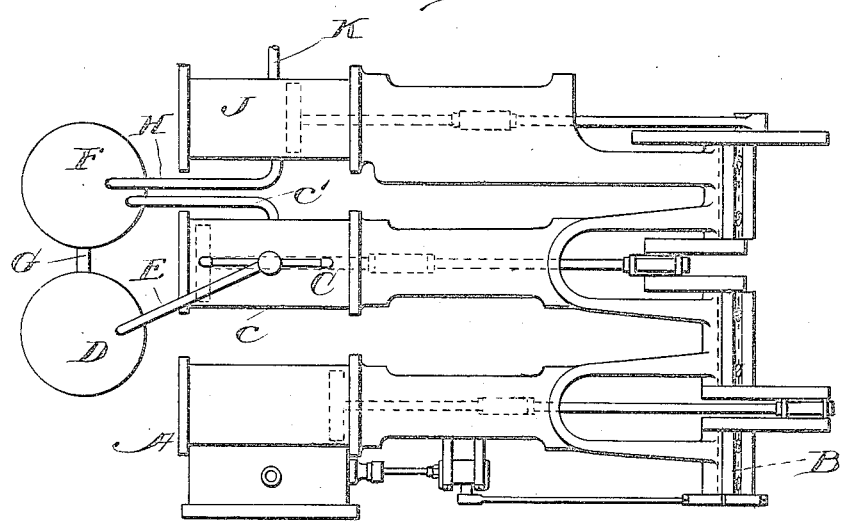
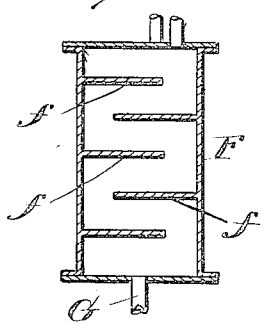
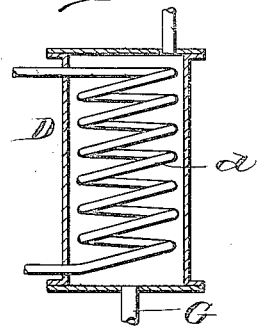

UNITED STATES PATENT OFFICE.

WILLARD O. FELT, OF NEW YORK, N. Y.

PROCESS FOR COMPRESSING AND PURIFYING AIR.

No. 869,966.     Specification of Letters Patent.     Patented Nov. 5, 1907.

Application filed April 9, 1906. Serial No. 310,627.

*To all whom it may concern:*

Be it known that I, WILLARD O. FELT, a citizen of the United States, and a resident of the city, county, and State of New York, have invented certain new and useful Improvements in Processes for Compressing and Purifying Air, of which the following is a specification.

One of the objects of my invention is to compress the air without heating and to purify the same during compression and in removing the moisture or aqueous vapor held in suspension so that the compressed dry air may be used expansively without choking the air passages and impeding the action of the valves n the expansion cylinder.

Other objects will appear from the hereinafter description.

I have illustrated one type of apparatus for carrying out my invention.

Referring to the drawing, Figure 1 is a plan view of such apparatus with the ordinary valves and other accessories of an engine and compressor removed therefrom. Fig. 2 is a longitudinal section of the compressed air and separating tank. Fig. 3 is a vertical longitudinal section of the glycerin cooling tank.

The part marked A on the drawing represents an ordinary steam engine for driving the crank shaft B. C is a compression cylinder driven by said engine in which the atmospheric air is compressed to about 6 or 10 atmospheres. $c$ is the air in the pipe of said compression cylinder and $c'$ is the outlet pipe.

D is a tank adapted to contain glycerin and is connected to the compression cylinder by the pipe E. This glycerin tank is provided with a coil $d$ therein through which air, water or other cooling medium may be circulated to keep the glycerin cool. The exhaust pipe $c'$ leads into the top of the compressed air and separating tank F, this tank being provided inside with a series of baffle plates $f$. The bottom of this compressed air and separating tank is connected to the bottom of the glycerin tank by the pipe G. Leading from the top of the compressed air and separating tank is a pipe H which is connected to the expansion cylinder J. This cylinder has an exhaust pipe K leading therefrom.

In operation, the glycerin tank D is supplied with glycerin and a cooling medium is caused to circulate through the coil $d$. The engine A is put into operation and through the crank shaft the compressor is driven. At each stroke of the piston of the compressor, air is drawn through the pipe $c$ and glycerin is drawn from the tank D through the pipe E into the cylinder. The glycerin is mixed with the air and it extracts the heat from the air generated during the compression and absorbs the aqueous vapor held in suspension in the air. The glycerin also prevents any leakage of air past the piston and valves, and also insures a complete discharge of the air from the compression cylinder. The compressed air and glycerin are discharged together from the compression cylinder through the exhaust pipe $c'$ into the compressed air and separating tank F. The glycerin and absorbed and contained aqueous vapor and heat falls on the baffle plates $f$ to the bottom of this tank and is drawn from said tank to the glycerin tank as the compressor operates. The compressed dry air in the tank F passes out through the pipe H to the expansion cylinder J in which it expands down to the pressure of the atmosphere doing work through the connecting rods and cranks to assist the steam cylinder in driving the compressor. If desired, I may pass this dry compressed air from the tank F into a surface condenser, not shown, if found necessary. It is understood that vapor cut-off gears are fitted to both the steam cylinder and air expansion cylinder. However, this is not shown, as the operation thereof is well understood. In locating the cranks of the driving shaft, the crank driving the air compressor leads the steam cylinder to apply the greatest pressure attainable to the piston of the air compressor at the time it is completing its stroke. When the glycerin contained in the tank becomes thoroughly saturated with aqueous vapor, it is drawn off and then heated to about 212 F. to evaporate the aqueous vapor contained therein. The glycerin so treated can be replaced in the tank D and used over and over again, no loss or waste taking place, except that which may occur through leakage. The exhaust from the expansion cylinder K may be discharged into an insulated pipe through which it is conveyed to the place where it is desired to utilize it for cooling. The mixture of the air and glycerin effected by the compressor C is a very important part of my invention. I have discovered that by subjecting the air during compression to the action of glycerin, I am enabled to remove practically all the aqueous vapor and impurities carried by the air besides extracting the heat generated during compression.

While I have described my invention as applied to air, it is well understood that other gases may be used.

While I have shown one type of apparatus for carrying out my invention, it is to be understood that I do not limit myself to said apparatus, as many other types of apparatus may be used for effecting my process, and various changes may be made in the form of apparatus shown without departing from my invention.

Having now described my invention, what I claim as new and desire to secure by Letters Patent is:

1. The process which consists in compressing a gas, and injecting glycerin in the gas while being compressed whereby the aqueous vapor and impurities contained in the gas and the heat generated by compression are absorbed by the glycerin.

2. The process which consists in compressing air, injecting glycerin in the air during compression, exhausting the glycerin and air, separating the air and glycerin, and again injecting the glycerin into the air being compressed.

3. The process which consists in compressing air, injecting glycerin in the air during compression, exhausting the glycerin and air, separating the air and glycerin, again injecting the glycerin into the air being compressed, and utilizing the separated air.

4. The process which consists in mixing a gas and glycerin together while the gas is under compression.

In testimony whereof, I have hereunto set my hand at the city, county and State of New York, this fourth day of April, 1906.

WILLARD O. FELT.

In presence of—
JOHN J. RANAGAN,
H. J. LILLIE.